(12) United States Patent
Wen et al.

(10) Patent No.: US 11,409,558 B2
(45) Date of Patent: Aug. 9, 2022

(54) METHOD, DEVICE AND COMPUTER PROGRAM PRODUCT FOR JOB MANAGEMENT

(71) Applicant: EMC IP Holding Company LLC, Hopkinton, MA (US)

(72) Inventors: Jian Wen, Chengdu (CN); Yi Wang, Chengdu (CN); Xing Min, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 359 days.

(21) Appl. No.: 16/802,502

(22) Filed: Feb. 26, 2020

(65) Prior Publication Data

US 2021/0117230 A1 Apr. 22, 2021

(30) Foreign Application Priority Data

Oct. 18, 2019 (CN) .......................... 201910995957.7

(51) Int. Cl.
*G06F 9/46* (2006.01)
*G06F 9/48* (2006.01)

(52) U.S. Cl.
CPC .......... *G06F 9/4856* (2013.01); *G06F 9/4881* (2013.01)

(58) Field of Classification Search
CPC .................................................... G06F 9/4856
USPC ........................................................ 718/106
See application file for complete search history.

(56) References Cited

U.S. PATENT DOCUMENTS

| 7,469,219 | B2 * | 12/2008 | Goldberg | G06Q 10/103 |
| | | | | 705/40 |
| 10,083,094 | B1 * | 9/2018 | Thomas | G06F 11/1466 |
| 10,248,487 | B1 * | 4/2019 | Garg | G06F 11/0757 |
| 10,296,377 | B1 * | 5/2019 | Jonsson | G06F 9/4843 |
| 11,249,862 | B2 * | 2/2022 | Wang | G06K 9/00536 |
| 2008/0307084 | A1 * | 12/2008 | Saigo | G06F 21/88 |
| | | | | 709/223 |
| 2011/0287767 | A1 * | 11/2011 | Huang | H04L 43/00 |
| | | | | 455/436 |
| 2013/0212587 | A1 * | 8/2013 | Doyle | G06F 9/4881 |
| | | | | 718/102 |

(Continued)

*Primary Examiner* — Mehran Kamran
(74) *Attorney, Agent, or Firm* — Womble Bond Dickinson (US) LLP

(57) ABSTRACT

According to embodiments of the present disclosure, a method, device and computer program product for job management are proposed. The method comprises: receiving, at a first device, status information of a first job sent by a second device at a first sending time, the first job running on the second device, the status information indicating a completion status of the first job; in accordance with a determination that the status information indicates the first job has not been completed, determining a send distribution period related to at least one second job different from the first job, the send distribution period covering respective sending times when devices running the at least one second job send status information of the at least one second job to the first device; and providing the second device an indication on a second sending time in the send distribution period, to instruct the second device to send further status information of the first job to the first device at the second sending time. Therefore, the present solution can achieve flexible self-adaptive job status information transmission.

21 Claims, 5 Drawing Sheets

(56) References Cited

U.S. PATENT DOCUMENTS

| | | | | |
|---|---|---|---|---|
| 2014/0358858 | A1* | 12/2014 | Camble | G06F 11/1453 |
| | | | | 707/634 |
| 2015/0146237 | A1* | 5/2015 | Sun | H04N 1/0001 |
| | | | | 358/1.14 |
| 2015/0339129 | A1* | 11/2015 | Divakaran | G06F 9/4405 |
| | | | | 713/2 |
| 2017/0161104 | A1* | 6/2017 | Johnson | G06F 9/4881 |
| 2017/0343991 | A1* | 11/2017 | Green | G05B 19/4183 |
| 2018/0143856 | A1* | 5/2018 | Du | G06F 9/4881 |
| 2019/0171494 | A1* | 6/2019 | Nucci | G06N 5/003 |
| 2020/0274946 | A1* | 8/2020 | Du | H04L 67/1002 |
| 2020/0401458 | A1* | 12/2020 | Roy | G06F 9/4887 |
| 2021/0116938 | A1* | 4/2021 | Sun | G07C 5/008 |
| 2021/0365275 | A1* | 11/2021 | Vattikuti | G06F 9/4881 |
| 2021/0373943 | A1* | 12/2021 | Sim | G06Q 10/02 |

* cited by examiner

METHOD, DEVICE AND COMPUTER PROGRAM PRODUCT FOR JOB MANAGEMENT

CROSS-REFERENCE TO RELATED APPLICATION

This patent application claims priority, under 35 U.S.C. § 119, of Chinese Patent Application No. 2019/0995957.7, filed Oct. 18, 2019, which is incorporated by reference herein in its entirety.

FIELD

Embodiments of the present disclosure generally relate to the field of computer technologies, and more specifically, to a method, device and computer program product for job management.

BACKGROUND

A backup storage system typically includes a control device and a plurality of storage devices. The control device is responsible for receiving a new backup job and dispatching it to one of the plurality of storage devices. Then, a client transmits backup data for the job to the storage device, and sends status information periodically to the control device until the job is completed. Therefore, there is a need for an appropriate job status information transmitting mechanism.

SUMMARY

Embodiments of the present disclosure provide a method, device and computer program product for job management.

In a first aspect of the present disclosure, a method is provided for job management. The method comprises: receiving, at a first device, status information of a first job sent by a second device at a first sending time, the first job running on the second device, the status information indicating a completion status of the first job; in accordance with a determination that the status information indicates the first job has not been completed, determining a send distribution period related to at least one second job different from the first job, the send distribution period covering respective sending times when devices running the at least one second job send status information of the at least one second job to the first device; and providing the second device an indication on a second sending time in the send distribution period, to instruct the second device to send further status information of the first job to the first device at the second sending time.

In a second aspect of the present disclosure, a device is provided for job management. The device comprises at least one processing unit and at least one memory. The at least one memory is coupled to the at least one processing unit and stores instructions executed by the at least one processing unit. The instructions, when executed by the at least one processing unit, cause the device to execute acts of: receiving, at a first device, status information of a first job sent by a second device at a first sending time, the first job running on the second device, the status information indicating a completion status of the first job; in accordance with a determination that the status information indicates the first job has not been completed, determining a send distribution period related to at least one second job different from the first job, the send distribution period covering respective sending times when devices running the at least one second job send status information of the at least one second job to the first device; and providing the second device an indication on a second sending time in the send distribution period, to instruct the second device to send further status information of the first job to the first device at the second sending time.

In a third aspect of the present disclosure, a computer program product is provided. The computer program product is tangibly stored on a non-transitory computer-readable medium and includes machine-executable instructions which, when executed, cause a machine to execute steps of the method as described in accordance with the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Figure 1:
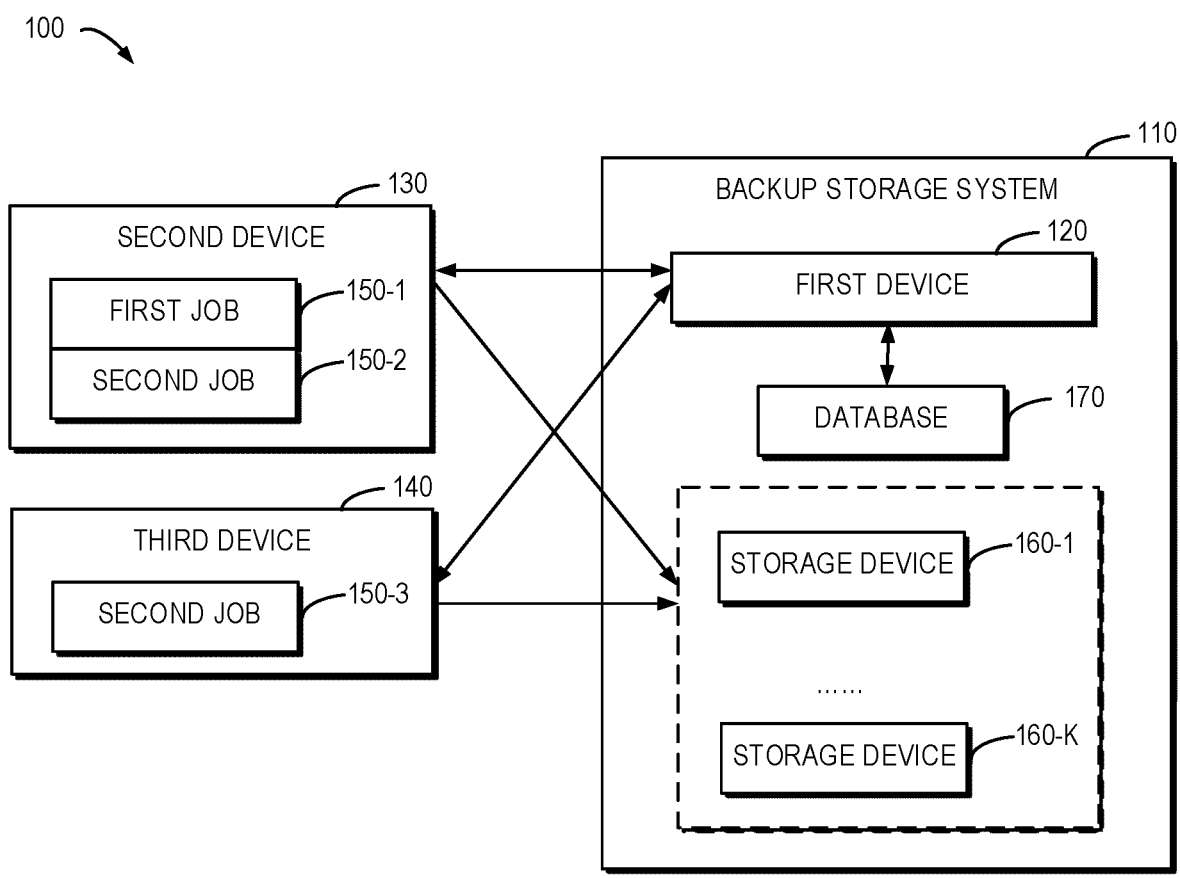
FIG. 1 illustrates a schematic diagram of an example of a job management environment according to some embodiments of the present disclosure.

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

In a backup storage system, if there are a great number of concurrent backup jobs (for example, jobs of hundreds of clients running concurrently), the resource (e.g., a Central Processing Unit (CPU)) usage of the control device is very high. This is because clients' data transmission processes are distributed into multiple storage devices, however, the status information of the jobs running on the clients can only be sent to the control device to be stored in a database of the control device. The database of the control device is provided for storing management data of a backup storage system, such as client information, job sending time, job status information, and the like. The control device also needs to provide the management data in the database, such that it can be displayed to users. Furthermore, the control device needs to establish and disconnect a connection (e.g., a socket connection) to transmit status information of jobs. In the meantime, for the sake of safety, the control device is required to encrypt and decrypt the status information of jobs. In this case, a lot of resources of the control device are consumed when hundreds of clients are transmitting status information of jobs simultaneously.

As a core device of the backup storage system, the control device is also responsible for some critical tasks, for example, job acceptance, job allocation, communication with clients and other authorized devices, database connection, and the like. If too many resources are involved in job status information transmission, it will impact other tasks with high priority to be processed by the control device, or even cause failure of other tasks. As a result, the control device easily becomes the bottleneck of the backup storage system.

The legacy solution is to increase the intervals for transmitting status information of jobs. However, the increased transmission intervals may cause the status information of jobs not updated in time. In particular when there are only few concurrent jobs, the update problem resulting from the solution becomes more acute.

According to an example embodiment of the present disclosure, there is provided an improved solution for job management. In the solution, status information of a first job sent by a second device at a first sending time is received at a first device. The first job runs on the second device, and the status information indicates a completion status of the first job. In accordance with a determination that the status information indicates the first job has not been completed, a send distribution period related to at least one second job different from the first job is determined. The send distribution period covers respective sending times when devices running the at least one second job sends status information of the at least one second job to the first device. An indication on a second sending time in the send distribution period is provided to a second device, to instruct the second device to send further status information of the first job to the first device at the second sending time.

In this way, based on future sending times of status information of other jobs, a send distribution period in which the sending times are distributed can be determined reasonably, and a next sending time of status information of a job having not been completed yet can be determined reasonably in the determined send distribution period. Therefore, the solution can achieve flexible self-adaptive job status information transmission.

Hereinafter, reference will be made to FIGS. 1-9 to describe examples of the present solution in detail. FIG. 1 illustrates a schematic diagram of an example of a job management environment 100 according to some embodiments of the present disclosure. The job management environment 100 includes a backup storage system 110, a second device 130 and a third device 140. The backup storage system 110 includes a first device 120 for controlling the backup storage system 110, and a plurality of storage devices 160-1 to 160-K for storing backup data (where K is an integer greater than 0, and the plurality of storage devices 160-1 to 160-K will be collectively referred to as "storage device 160" below). The first device 120 may access a database 170 for storing management data of the backup storage system 110. For example, the management data may include information of devices running jobs, job sending times, job status information, and the like. The database 170 may be a local storage device and/or an external storage device of the first device 120. The first device 120 may also provide the stored management data for display, for example, display to an administrator of the backup storage system 110, and the like.

The first device 120, the second device 130 and the third device 140 may be any device having a computing capability including, but not limited to, a cloud computing device, large-scale computer, personal computer, desktop computer, laptop computer, tablet computer, personal digital assistant, and the like.

The first device 120 may perform control tasks, for example, receiving jobs for backup from the second device 130 and the third device 140, allocating backup data to be stored by the jobs to the storage device 160 for storage, communicating with the second device 130 and the third device 140, and the like, and the first device 120, therefore, may also be referred to as a control device.

For example, the first device 120 may receive a first job 150-1 and second jobs 150-2 and 150-3 from the second device 130 and the third device 140, and backup data to be stored by these jobs are allocated to one of the plurality of storage devices 160 for storage. Then, the first device 120 may indicate the allocated storage device 160 to the second device 130 and the third device 140, and indicate respective sending times for status information of the first job 150-1 and second jobs 150-2 and 150-3. The second device 130 and the third device 140 may transmit the backup data for the first job 150-1 and the second jobs 150-2 and 150-3 to the allocated storage device 160, and send, at the indicated sending time, to the control device 120 status information indicating the completion status of the first job 150-1 and the second jobs 150-2 and 150-3, until the jobs are completed (i.e., backup of backup data corresponding to the jobs is completed).

In the case that the jobs have not been completed yet, the devices running the jobs will send status information of the jobs to the first device 120 at a certain time in the future. Reference will be made to FIGS. 2-8 below to describe determining a next sending time.

Figure 2:
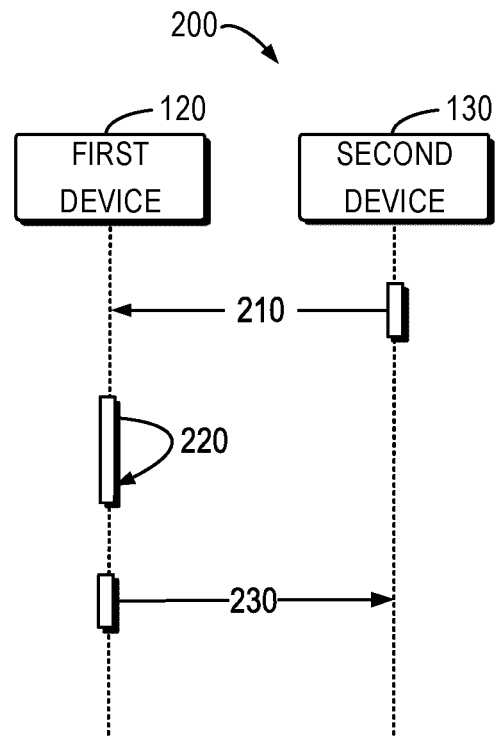
FIG. 2 illustrates a piping diagram of a process for job management according to some embodiments of the present disclosure.

FIG. 2 illustrates a piping diagram of a process 200 for job management according to some embodiments of the present disclosure. For example, the process 200 involves the first device 120 and the second device 130 as shown in FIG. 1. It would be appreciated that the process 200 may include additional steps not shown and/or may omit the steps as shown, and the scope of the present disclosure is not limited in this regard.

At 210, the first device 120 receives status information of the first job 150-1 sent by the second device 130 at a first sending time. As aforementioned, the first job 150-1 runs on the second device 130, and the status information indicates the completion status of the first job 150-1. Other jobs running for storing backup data to the backup storage system 110 are also referred to as second jobs, for example, the second job 150-2 running on the second device 130 and the second job 150-3 running on the third device 140. For convenience of description, "job 150" used herein may refer to any job running for storing backup data to the backup storage system 110. For ease of understanding, the operation when the first device 120 receives the status information will be described with reference to FIGS. 3-5.

Figure 3:
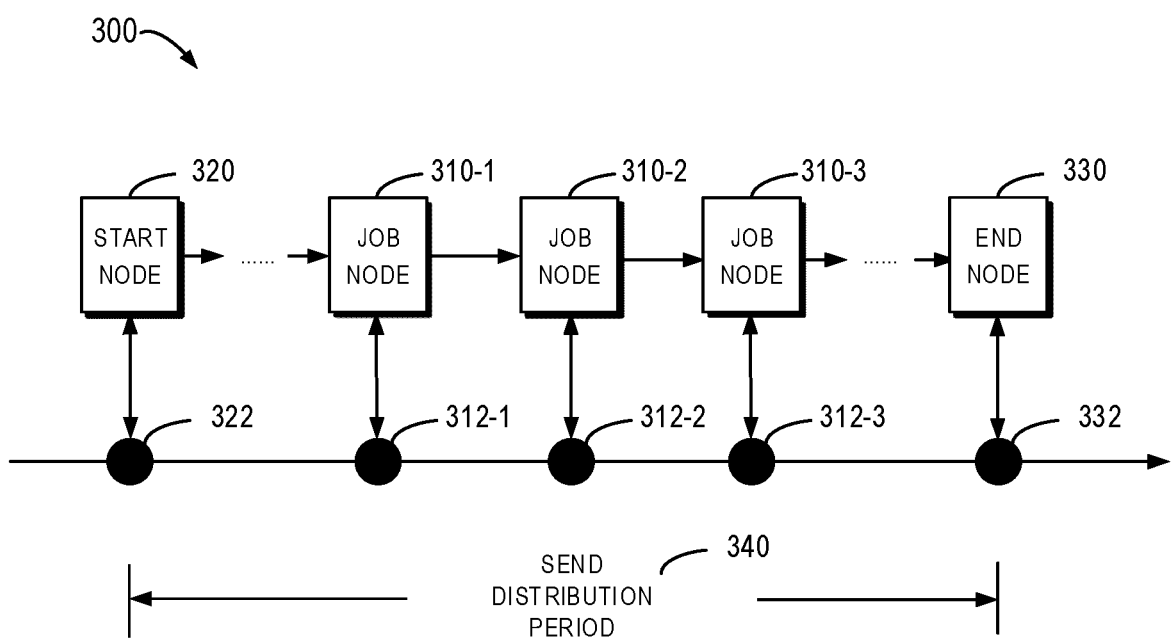
FIG. 3 illustrates a schematic diagram of an example of sending times, a send distribution period and job nodes according to some embodiments of the present disclosure.

FIG. 3 illustrates a schematic diagram of an example of sending times, a send distribution period and job nodes according to some embodiments of the present disclosure. As shown in FIG. 3, sending times 312-1 to 312-3 (collectively referred to as "sending time 312" below) of the jobs 150 are shown on a timeline, where the sending time 312-1 indicates a sending time of the second job 150-2, the sending time 312-2 indicates a sending time of the first job 150-1, and the sending time 312-3 indicates a sending time of the second job 150-3. All of the sending times 312 fall within the send distribution period 340. The send distribution period 340 has a start time 322 and an end time 322. In an initial state, since no job is running, the length of the send distribution period 340 may be set to an expected length. Hereinafter, reference will be made to FIG. 7 to describe determination of the expected length.

In some embodiments, the first device 120 may manage jobs 150 related to the backup storage system 110 using a job list 300. The job list 300 includes a plurality of job nodes 310-1 to 310-3 (collectively referred to as "job node 310" below). The job node 310-2 corresponds to the first job 150-1 while the job nodes 310-1 and 310-3 correspond to the second jobs 150-2 and 150-3, respectively. Therefore, the job nodes 310 may be mapped to the sending times 312 of respective jobs 150 corresponding thereto. For example, the job node 310-1 is mapped to the sending time 312-1 of the first job 150-1, the job node 310-2 is mapped to the sending time 150-1 of the second job 150-2, and the job node 310-3 is mapped to the sending time 312-3 of the second job 150-3.

Figure 4:
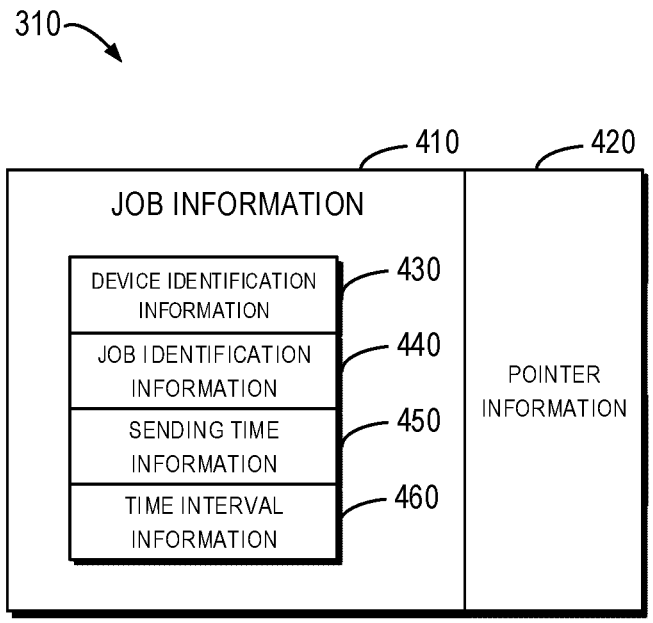
FIG. 4 illustrates a schematic diagram of an example of a structure of a job node according to some embodiments of the present disclosure.

For ease of understanding, the specific structure of the job node 310 will be described in conjunction with FIG. 4. FIG. 4 illustrates a schematic diagram of an example of a structure of the job node 310 according to some embodiments of the present disclosure. As shown in FIG. 4, the job node 310 includes job information 410 and pointer information 420. The job information 410 includes device identification information 430, job identification information 440, sending time information 450, and time interval information 460. The device identification information 430 indicates an identification of a device running the job 150. For example, the device identification information 430 of the job node 310-2 indicates an identification of the second device 130 running the first job 150-1. The job identification information 440 is provided for identifying uniquely the respective job 150 in the backup storage system 110.

The sending time information 450 indicates a sending time when the device running the job 150 is to send status information of the job 150 to the first device 120. For example, the sending time information 450 of the job node 310-2 indicates the time when the second device 130 is to send the first job 150-1 to the first device 120 is "2019.10.17.12:00:00", namely 12:00:00 p.m. on Oct. 17, 2019. The time interval information 460 indicates a time interval between the sending time of the status information of the current job 150 and the sending time of the status information of the next adjacent job 150. For example, if the sending time information 450 of the job node 310-3 is "2019.10.17.12:00:15", namely 12:00:15 p.m. on Oct. 17, 2019, the time interval information 460 of the job node 310-2 is 15 seconds.

Moreover, the pointer information 420 indicates a next job node of the current job node. The sending time of the status information of the job corresponding to the next job node is after the sending time of the status information of the job corresponding to the current job node, and adjacent to the sending time of the status information of the job corresponding to the current job node. For example, the pointer information 420 of the job node 310-2 indicates the job node 310-3.

For convenience of management, the job list 300 further includes a start node 320 and an end node 330 not corresponding to any real job 150. The start node 320 is mapped to the start time 322, and the end node 330 is mapped to the end time 332. In the initial state, the job list 330 only includes a start node 320 and an end node 330.

After the first device 120 has received the status information of the first job 150-1 sent by the second device 130 at the first sending time 312-2, the sending of the status information of the first job 150-2 has been completed, the send distribution period 340 no longer includes the first sending time 312-2.

Figure 5:
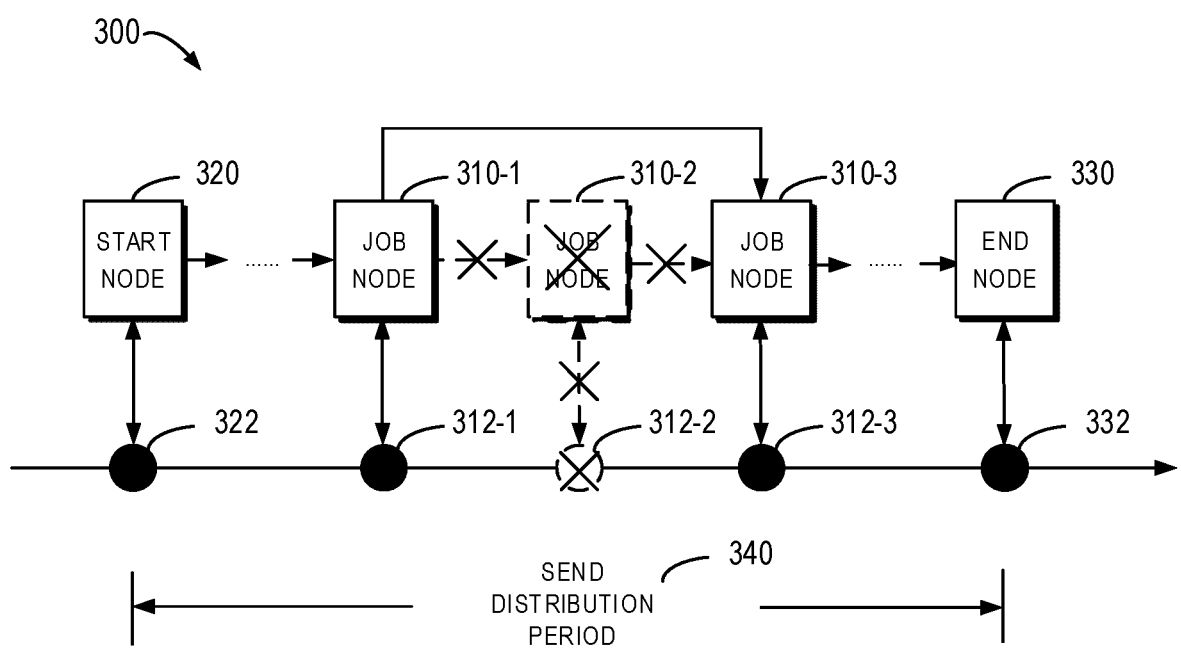
FIG. 5 illustrates a schematic diagram of an example of sending times, a send distribution period and job nodes after receiving status information of a first job according to some embodiments of the present disclosure.
Figure 6:
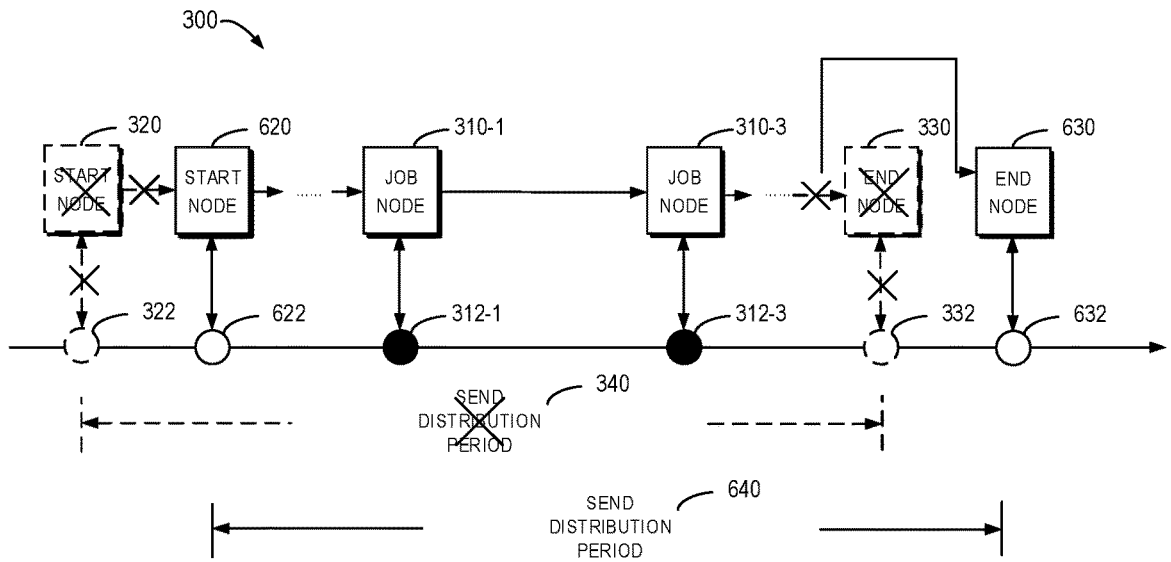
FIG. 6 illustrates a schematic diagram of an example of determining a send distribution period according to some embodiments of the present disclosure.

FIG. 5 illustrates a schematic diagram of an example of sending times, the send distribution period and job nodes after receiving the status information of the first job 150-1 according to some embodiments of the present disclosure. As shown in FIG. 5, the first sending time 312-2 is deleted from the send distribution period 340, and the job node 310-2 corresponding to the first job 150-1 is also deleted from the job list 300 accordingly. At this time, for the job node 310-1, the next job node thereof is changed to the job node 310-3. Accordingly, the first device 120 may update the pointer information of the job node 310-1 as indicating the job node 310-3. Further, the first device 120 may update the time interval information of the job node 310-1, such that the time interval as indicated by the updated time interval information is a sum of the original time interval of the job node 310-1 and the time interval of the job node 310-2.

In addition, it would be appreciated that, although the sending time 312-1 of the status information of the second job 150-2 is actually prior to the first sending time 312-2 of the status information of the first job 150-1, it is also possible that the status information of the first job 150-1 would be received first at the first device 120 due to network congestion and the like.

In some circumstances, if the first device 120 determines that the first job 150-1 has not been completed based on the status information, the first device 120 may determine the sending time when the second device 130 will send the status information of the first job 150-1 again. In the embodiments of the present disclosure, the first device 120 determines dynamically a new sending time of the status information of the first job 150-1, based on sending times of other jobs (e.g., the second jobs 150-2 and 150-3) that will also provide status information thereof to the first device 120. Returning to FIG. 2, specifically, at 220, the first device 120 determines a send distribution period 640 related to the at least one second job 150-2 and 150-3 different from the first job 150-1. The send distribution period 640 covers respective sending times (e.g., the sending times 312-1 and 312-3 as shown in FIG. 3) when the devices running the at least one second job 150-2 and 150-3 are to send the status information of the at least one second job 150-2 and 150-3 to the first device 120.

As compared to the original send distribution period 340, the send distribution period 640 is re-determined by the first device 120 for the first job 150-1. In some embodiments, the first device 120 may determine the current time as a start time 622 of the send distribution period 640. Accordingly, the first device 120 may create a start node 620 mapped to the start time 622 in the job list 300. The sending time information of the start node 620 indicates the current time, and the time interval information indicates a time interval between the start time and the sending time of the status information of the next adjacent job 150.

In addition, the first device 120 may determine an expected length of the send distribution period 640, and determine, based on the expected length of the send distribution period 640, an end time 632 of the send distribution period 640. Accordingly, the first device 120 may create an end node 630 mapped to the end time 632 in the job list 300.

The expected length of the send distribution period 640 is changed dynamically with a load of the first device 120 and frequency of the status information of the jobs 150 to be received. The load may reflect resource usage of the first device 120, such as processing resource usage, storage resource usage, input/output usage, and the like. The frequency may reflect time intervals between sending times of the future jobs. For example, an initial value of the expected length is 10 seconds. When the load or frequency is increased, the expected length is prolonged accordingly; and when the load or frequency is reduced, the expected length is shortened accordingly.

Moreover, a requirement on the expected length may be set. For example, it may be specified that the expected length should be greater than a predetermined time length (e.g., 10 seconds). Further, in order to avoid an exceedingly high resource usage, it may be specified that resource usage over a time period having the expected length should be lower than a predetermined usage threshold (for example, the CPU usage should be lower than 80%). As such, the first device 120 may predict resource usage sequentially in candidate periods of t+1, t+2 . . . t+i (where t represents the current time, and i represents a number of days) until the candidate period meeting the requirement is obtained, and the time length of the candidate period is determined as the expected length.

As a result, in some embodiments, the first device 120 obtains resource usage of the first device and respective sending times 312-1 and 312-3 of the status information of the at least one second job 150-2 and 150-3, and determines the expected length, based on the resource usage and the respective sending times 312-1 and 312-3 of the status information of the at least one second job 150-2 and 150-3.

Specifically, in some embodiments, the first device 120 may compute a set of time intervals, based on the respective sending times 312-1 and 312-3 of the status information of the at least one second job 150-2 and 150-3. Each time interval of the set of the time intervals is a difference between two adjacent respective sending times. The first device 120 may determine a future candidate period associated with the expected length, and determine, based on the resource usage and the set of time intervals, expected resource usage of the first device 120 over the candidate period. The first device 120 may determine, in accordance with a determination that expected resource usage is lower than a predetermined usage threshold and the candidate period has a time length greater than a predetermined time length, the time length as the expected length.

In some embodiments, a neural network model (e.g., a Long Short-Term Memory (LSTM) model) may be used to predict resource usage over a candidate period. Before performing prediction using the LSTM model, the LSTM model needs to be trained. In many cases, the preceding resource usage impacts the current resource usage. In addition, as the first device 120 is to receive more status information, more resources of the first device 120 will be occupied. Therefore, a more accurate prediction result can be obtained by combining the time interval of the status information to be received by the first device 120 and the preceding resource usage.

In order to train the LSTM model, the preceding resource usage and the time interval need to be transformed into input and output sequences in pair. Consequently, the time sequence prediction problem can be re-framed as a supervised learning problem, and the supervised learning problem can be framed as predicting the resource usage in a candidate period, given the resource usage at the current time and the time intervals of the upcoming sending times.

A sliding window method may be used to frame multi-step prediction. Table 1 shows sending times and resource usage corresponding thereto. Table 2 shows framing the sending times and the resource usage as a one-step prediction dataset for supervised learning with a window width of w.

TABLE 1

| | Resource usage | | | |
|---|---|---|---|---|
| Sending time | Processing resource | Storage resource | . . . | Input/output resource |
| $T_1$ | $C_1$ | $M_1$ | . . . | $I_1$ |
| $T_2$ | $C_2$ | $M_2$ | . . . | $I_2$ |
| $T_3$ | $C_3$ | $M_3$ | . . . | $I_3$ |
| . . . | . . . | . . . | . . . | . . . |
| $T_n$ | $C_n$ | $M_n$ | . . . | $I_n$ |

TABLE 2

| Input vector | Output vector |
|---|---|
| $[C_1 M_1 I_1 \Delta T_1 \ldots \Delta T_w]$ | $[C_{w+1} M_{w+1} I_{w+1}]$ |
| $[C_2 M_2 I_2 \Delta T_2 \ldots \Delta T_{w+1}]$ | $[C_{w+2} M_{w+2} I_{w+2}]$ |
| $[C_3 M_3 I_3 \Delta T_3 \ldots \Delta T_{w+2}]$ | $[C_{w+3} M_{w+3} I_{w+3}]$ |
| . . . | . . . |

Figure 7:
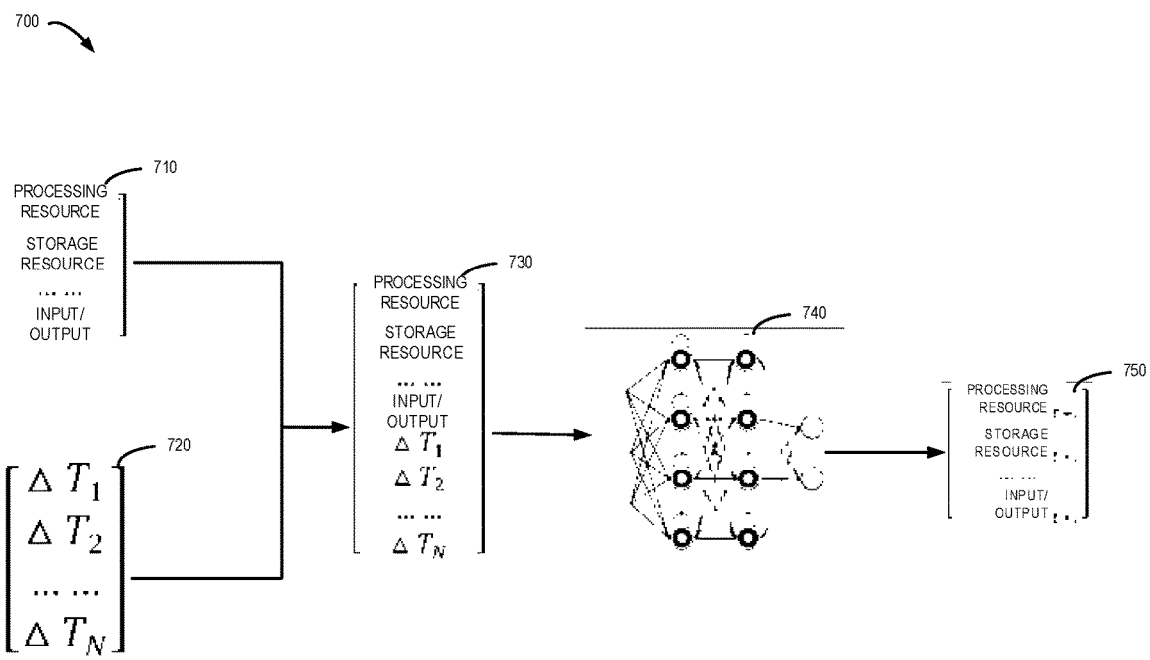
FIG. 7 illustrates a schematic diagram of an example of predicting resource usage according to some embodiments of the present disclosure.

The trained LSTM model can be used to predict the resource usage. FIG. 7 illustrates a schematic diagram 700 of an example of predicting resource usage according to some embodiments of the present disclosure. As shown in FIG. 7, the first device 120 may obtain resource usage 710 of the first device 120 and a set of time intervals 720 computed based on respective sending times (e.g., sending times 312-1 and 312-3) of N second jobs (e.g., second jobs 150-2 and 150-3), where N is an integer greater than 0. The first device 120 may combine the resource usage 710 and the set of time intervals 720 as a vector 730, and input the vector 730 into the trained LSTM model 740, to predict resource usage in a candidate period and thus determine an expected length.

Returning to FIG. 6, after determining the expected length, the first device 120 may determine the end time of the send distribution period 640. In some embodiments, the first device 120 may obtain a sending time of status information of the last job in the at least one second job. Assuming that the second job 150-3 is the last job, the first device 120 may obtain the sending time 312-3 of the status information of the second job 150-3.

The first device 120 may determine an interval length between the sending time 312-3 of the status information of the last job 150-3 and the start time 622 of the send distribution period 640, and compare the interval length with the expected length. If it is determined that the expected length exceeds the interval length, the first device 120 may add the start time 622 and the expected length, to determine the end time 632 of the send distribution period 640.

Moreover, if it is determined that the expected length is less than the interval length, the first device 120 may divide the expected length by the number of the second jobs to obtain the divided result, and add the divided result and the sending time 312-3 of the status information of the last job 150-3 to determine the end time 632 of the send distribution period 640.

This is because the send distribution period 640 can be directly extended to the expected length when the expected length exceeds the interval length. In contrast, when the expected length is less than the interval length, the send distribution period 640 can be shortened in a proper scale.

Returning to FIG. 2, after determining the send distribution period, at 230, the first device 120 provides the second device 130 an indication on a second sending time in the send distribution period 640, to instruct the second device 130 to send further status information of the first job 150-1 to the first device 120 at the second sending time.

In some embodiments, the first device 120 may determine two adjacent times having a maximum interval therebetween in the send distribution period 640, where the time here indicates a start time, an end time or a sending time. The first device 120 may determine a candidate time between the two adjacent times as a second sending time, and provide an indication on the second sending time to the second device 130. For ease of understanding, determining the second sending time will be described below with reference to FIG. 8.

Figure 8:
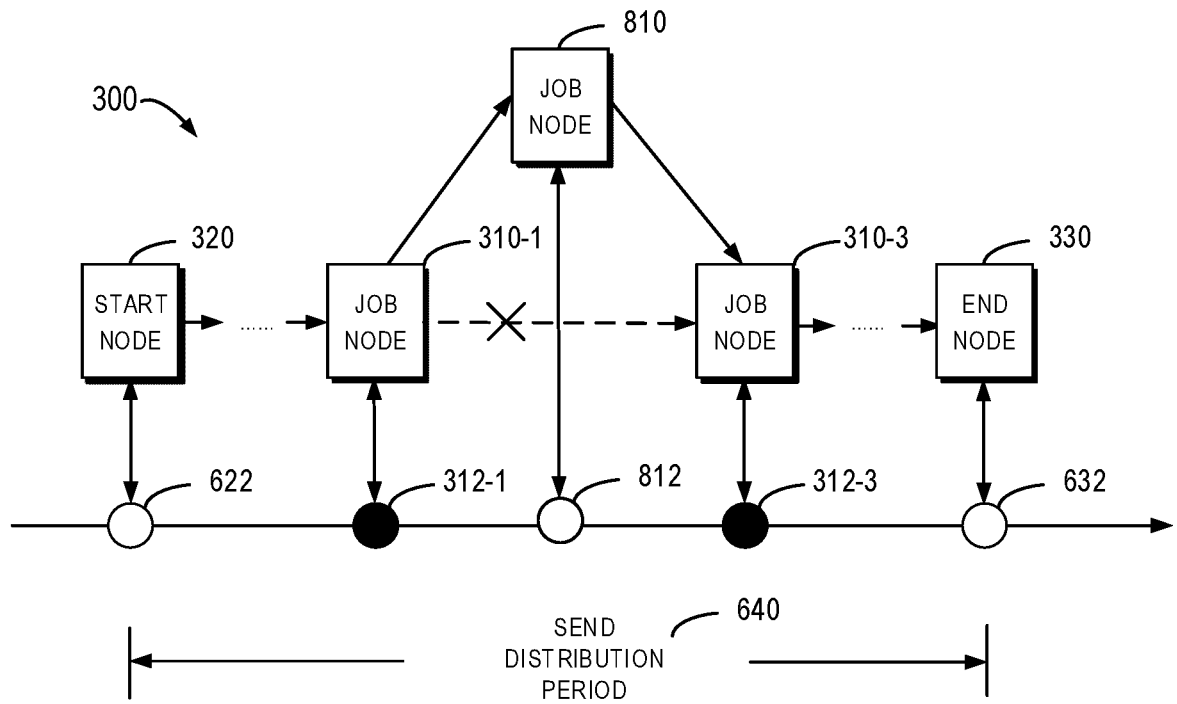
FIG. 8 illustrates a schematic diagram of an example of determining a second sending time according to some embodiments of the present disclosure.

FIG. 8 illustrates an example of determining a second sending time according to embodiments of the present disclosure. As shown in FIG. 8, the first device 120 may determine two adjacent times with the maximum interval therebetween in the send distribution period 640 as sending times 312-1 and 312-3, and determine a candidate time 812 between the sending times 312-1 and 312-3 as the second sending time. In some embodiments, the first device 120 may determine a time in the middle of the two adjacent sending times 312-1 and 312-3 as the second sending time 312.

Accordingly, the first device 120 may create a job node 810 mapped to the second sending time 812 in the job list 300, and insert the job node 810 between the job nodes 310-1 and 310-3. For example, the first device 120 may update the pointer information of the job node 310-1 as indicating the job node 810, and update the time interval information of the job node 310-1 as a difference between the second sending time 812 and the sending time 312-1 of the status information of the second job 150-2. Moreover, the first device 120 may set the pointer information of the job node 810 as indicating the job node 310-3, and set the time interval information of the job node 810 as a difference between the sending time 312-3 of the status information of the second job 150-3 and the second sending time 812.

In this way, a next sending time of status information of a job having not been completed yet can be determined reasonably based on future sending times of status information of other jobs in combination with the current resource usage. Therefore, the present solution can achieve flexible self-adaptive job status information transmission.

Figure 9:
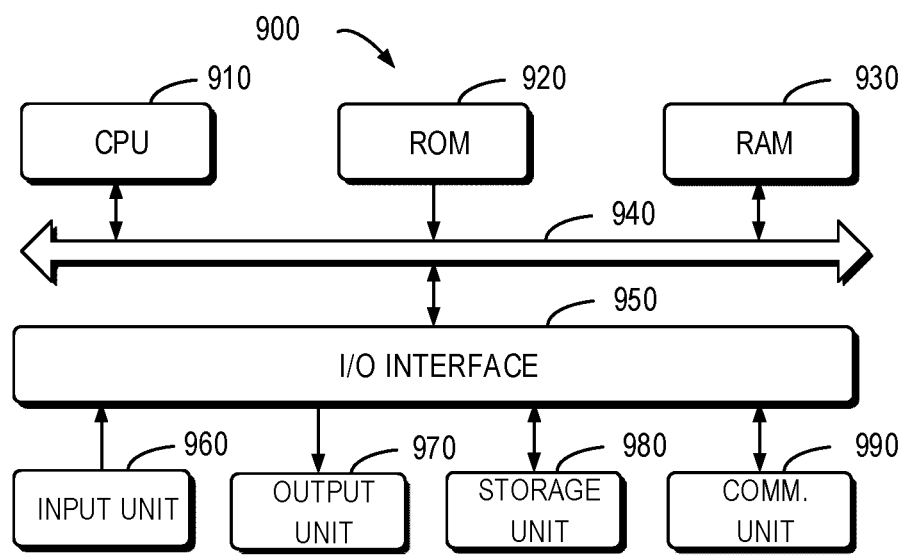
FIG. 9 illustrates a schematic diagram of an example device that can be used to implement embodiments of the present disclosure.

FIG. 9 illustrates a block diagram of an example device 900 that may be used to implement embodiments of the present disclosure. For example, the first device 120 as shown in FIG. 1 may be implemented by the device 900. As shown, the device 900 includes a central processing unit (CPU) 910 which performs various appropriate acts and processing, based on computer program instructions stored in a read-only memory (ROM) 920 or computer program instructions loaded from a storage unit 980 to a random access memory (RAM) 930. The RAM 930 stores therein various programs and data required for operations of the device 900. The CPU 910, the ROM 920 and the RAM 930 are connected via a bus 940 with one another. An input/output (I/O) interface 950 is also connected to the bus 940.

The following components in the device 900 are connected to the I/O interface 950: an input unit 960 such as a keyboard, a mouse and the like; an output unit 970 including various kinds of displays and a loudspeaker, etc.; a storage unit 980 including a magnetic disk, an optical disk, and etc.; a communication unit 990 including a network card, a modem, and a wireless communication transceiver, etc. The communication unit 990 allows the device 900 to exchange information/data with other devices through a computer network such as the Internet and/or various kinds of telecommunications networks.

Various processes and processing described above, e.g., the process 200, may be executed by the processing unit 910. For example, in some embodiments, the process 200 may be implemented as a computer software program that is tangibly included in a machine-readable medium, e.g., the storage unit 980. In some embodiments, part or all of the computer programs may be loaded and/or mounted onto the device 900 via ROM 920 and/or communication unit 990. When the computer program is loaded to the RAM 930 and executed by the CPU 910, one or more steps of the process 200 as described above may be performed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card and/or network interface in each computing/processing device receive computer-readable program instructions from the network and forward the computer readable program instructions for storage in a computer readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing status information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer readable storage medium that can direct a computer, a programmable data processing device, and/or other devices to function in a particular manner, such that the computer-readable storage medium having instructions stored therein includes an article of manufacture including instructions which implement aspects of the functions/acts specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for job management, comprising:
receiving, at a first device, status information of a first job sent by a second device at a first sending time, the first job running on the second device, the status information indicating a completion status of the first job;
in accordance with the status information that indicates the first job has not been completed, determining a send distribution period related to at least one second job different from the first job, the send distribution period covering respective sending times when devices running the at least one second job send status information of the at least one second job to the first device;
wherein determining the send distribution period comprises:

determining a current time as a start time of the send distribution period, determining an expected length of the send distribution period; and determining, based on the expected length of the send distribution period, an end time of the send distribution period;

wherein determining the expected length comprises:

obtaining a resource usage of the first device and the respective sending time of the status information of the at least one second job; and determining the expected length based on the resource usage and the respective sending times of the status information of the at least one second job; and providing the second device an indication on a second sending time in the send distribution period, to instruct the second device to send further status information of the first job to the first device at the second sending time.

2. The method of claim 1, wherein obtaining the resource usage comprises obtaining at least one of the following:

processing resource usage of the first device;

storage resource usage of the first device; and input/output usage of the first device.

3. The method of claim 1, wherein determining the expected length based on the resource usage and the respective sending times of the status information of the at least one second job, comprises:

computing a set of time intervals based on the respective sending times of the status information of the at least one second job, each time interval in the set of time intervals being a difference of two adjacent respective sending times;

determining a candidate period associated with the expected length;

determining, based on the resource usage and the set of time intervals, expected resource usage of the first device within the candidate period; and in accordance with a determination that the expected resource usage is lower than a predetermined usage threshold and the candidate period has a time length greater than a predetermined time length, determining the time length as the expected length.

4. The method of claim 1, wherein determining the end time of the send distribution period comprises:

obtaining a sending time of status information of a last job in the at least one second job; and in accordance with a determination that the expected length exceeds an interval length between the sending time of the status information of the last job and the start time of the send distribution period, adding the start time and the expected length, to determine the end time of the send distribution period; and in accordance with a determination that the expected length is less than the interval length, dividing the expected length by a number of the at least one second job, to obtain a divided result, and adding the divided result and the sending time of the status information of the last job, to determine the end time of the send distribution period.

5. The method of claim 1, wherein providing the second device the indication on the second sending time in the send distribution period comprises:

determining two adjacent times having a maximum interval therebetween in the send distribution period;

determining a candidate time falling between the two adjacent times as the second sending time; and providing the second device the indication on the second sending time.

6. The method of claim 1, wherein the resource usage of the first device is predicted using a neural network model.

7. The method of claim 1, wherein the expected length of the send distribution period is changed dynamically with a load of the first device.

8. A device for job management, comprising:

at least one processing unit; and at least one memory coupled to the at least one processing unit and storing instructions executed by the at least one processing unit, the instructions, when executed by the at least one processing unit, causing the device to execute acts comprising:

receiving, at a first device, status information of a first job sent by a second device at a first sending time, the first job running on the second device, the status information indicating a completion status of the first job;

in accordance with the status information that indicates the first job has not been completed, determining a send distribution period related to at least one second job different from the first job, the send distribution period covering respective sending times when devices running the at least one second job send status information of the at least one second job to the first device;

wherein determining the send distribution period comprises:

determining a current time as a start time of the send distribution period, determining an expected length of the send distribution period; and determining, based on the expected length of the send distribution period, an end time of the send distribution period;

wherein determining the expected length comprises:

obtaining a resource usage of the first device and the respective sending time of the status information of the at least one second job; and determining the expected length based on the resource usage and the respective sending times of the status information of the at least one second job; and providing the second device an indication on a second sending time in the send distribution period, to instruct the second device to send further status information of the first job to the first device at the second sending time.

9. The device of claim 8, wherein obtaining the resource usage comprises obtaining at least one of the following:

processing resource usage of the first device;

storage resource usage of the first device; and input/output usage of the first device.

10. The device of claim 8, wherein determining the expected length based on the resource usage and the respective sending times of the status information of the at least one second job, comprises:

computing a set of time intervals based on the respective sending times of the status information of the at least one second job, each time interval in the set of time intervals being a difference of two adjacent respective sending times;

determining a candidate period associated with the expected length;

determining, based on the resource usage and the set of time intervals, expected resource usage of the first device within the candidate period; and in accordance with a determination that the expected resource usage is lower than a predetermined usage threshold and the candidate period has a time length greater than a predetermined time length, determining the time length as the expected length.

11. The device of claim 8, wherein determining the end time of the send distribution period comprises:
obtaining a sending time of status information of a last job in the at least one second job; and
in accordance with a determination that the expected length exceeds an interval length between the sending time of the status information of the last job and the start time of the send distribution period, adding the start time and the expected length, to determine the end time of the send distribution period; and
in accordance with a determination that the expected length is less than the interval length, dividing the expected length by a number of the at least one second job, to obtain a divided result, and adding the divided result and the sending time of the status information of the last job, to determine the end time of the send distribution period.

12. The device of claim 8, wherein providing the second device the indication on the second sending time in the send distribution period comprises:
determining two adjacent times having a maximum interval therebetween in the send distribution period;
determining a candidate time falling between the two adjacent times as the second sending time; and
providing the second device the indication on the second sending time.

13. The device of claim 8, wherein the resource usage of the first device is predicted using a neural network model.

14. The device of claim 8, wherein the expected length of the send distribution period is changed dynamically with a load of the first device.

15. A computer program product, tangibly stored on a non-transitory computer-readable medium and including machine-executable instructions which, when executed, cause a machine to execute acts comprising:
receiving, at a first device, status information of a first job sent by a second device at a first sending time, the first job running on the second device, the status information indicating a completion status of the first job;
in accordance with the status information that indicates the first job has not been completed, determining a send distribution period related to at least one second job different from the first job, the send distribution period covering respective sending times when devices running the at least one second job send status information of the at least one second job to the first device;
wherein determining the send distribution period comprises:
determining a current time as a start time of the send distribution period, determining an expected length of the send distribution period; and
determining, based on the expected length of the send distribution period, an end time of the send distribution period;
wherein determining the expected length comprises:
obtaining a resource usage of the first device and the respective sending time of the status information of the at least one second job; and
determining the expected length based on the resource usage and the respective sending times of the status information of the at least one second job; and
providing the second device an indication on a second sending time in the send distribution period, to instruct the second device to send further status information of the first job to the first device at the second sending time.

16. The computer program product of claim 15, wherein obtaining the resource usage comprises obtaining at least one of the following:
processing resource usage of the first device;
storage resource usage of the first device; and
input/output usage of the first device.

17. The computer program product of claim 15, wherein determining the expected length based on the resource usage and the respective sending times of the status information of the at least one second job, comprises:
computing a set of time intervals based on the respective sending times of the status information of the at least one second job, each time interval in the set of time intervals being a difference of two adjacent respective sending times;
determining a candidate period associated with the expected length;
determining, based on the resource usage and the set of time intervals, expected resource usage of the first device within the candidate period; and
in accordance with a determination that the expected resource usage is lower than a predetermined usage threshold and the candidate period has a time length greater than a predetermined time length, determining the time length as the expected length.

18. The computer program product of claim 15, wherein determining the end time of the send distribution period comprises:
obtaining a sending time of status information of a last job in the at least one second job; and
in accordance with a determination that the expected length exceeds an interval length between the sending time of the status information of the last job and the start time of the send distribution period, adding the start time and the expected length, to determine the end time of the send distribution period; and
in accordance with a determination that the expected length is less than the interval length, dividing the expected length by a number of the at least one second job, to obtain a divided result, and adding the divided result and the sending time of the status information of the last job, to determine the end time of the send distribution period.

19. The computer program product of claim 15, wherein providing the second device the indication on the second sending time in the send distribution period comprises:
determining two adjacent times having a maximum interval therebetween in the send distribution period;
determining a candidate time falling between the two adjacent times as the second sending time; and
providing the second device the indication on the second sending time.

20. The computer program product of claim 15, wherein the resource usage of the first device is predicted using a neural network model.

21. The computer program product of claim 15, wherein the expected length of the send distribution period is changed dynamically with a load of the first device.

* * * * *